US006280829B1

(12) United States Patent
Kawamura et al.

(10) Patent No.: US 6,280,829 B1
(45) Date of Patent: Aug. 28, 2001

(54) CERAMIC COMPOSITION FOR USE IN FORMING ELECTRONIC COMPONENTS

(75) Inventors: Keizo Kawamura; Takashi Amano; Tetsuyuki Suzuki, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/488,119

(22) Filed: Jan. 20, 2000

(30) Foreign Application Priority Data

| | | |
|---|---|---|
| Jan. 19, 1999 | (JP) | 11-010043 |
| Oct. 13, 1999 | (JP) | 11-291318 |

(51) Int. Cl.[7] .......... B32B 3/00

(52) U.S. Cl. .......... 428/210; 174/258; 501/32; 501/66; 501/77

(58) Field of Search .......... 501/32, 66, 77; 428/210; 174/258

(56) References Cited

U.S. PATENT DOCUMENTS

| | | | | |
|---|---|---|---|---|
| 4,390,638 | * | 6/1983 | Mennemann et al. | 501/77 |
| 5,141,899 | * | 8/1992 | Jean et al. | 501/32 |
| 5,316,985 | * | 5/1994 | Jean et al. | 501/32 |

* cited by examiner

*Primary Examiner*—Cathy Lam
(74) *Attorney, Agent, or Firm*—Rosenman & Colin, LLP.

(57) ABSTRACT

A ceramic composition is provided with a glass based material including $SiO_2$, $Al_2O_3$, $B_2O_3$, and at least one selected from a group of Cao and MgO, and particles dispersed in the glass based material. The particles includes $CaSiO_3$ or $MgSiO_3$ as a main component. A sintered state of the ceramic composition has an anti-bending strength of 1500 kg/cm$^2$ or higher.

6 Claims, No Drawings

CERAMIC COMPOSITION FOR USE IN FORMING ELECTRONIC COMPONENTS

FIELD OF THE INVENTION

The present invention relates to a ceramic composition for use in forming electronic components such as a chip type resistor, a thin film inductor, a thin film capacitor or a circuit board; and, more particularly, to a ceramic composition most suitable for use in forming a chip type electronic component or a circuit board on a ceramic substrate.

DESCRIPTION OF THE PRIOR ART

An alumina substrate or a glass-based insulating ceramic material having $Al_2O_3$ and $SiO_2$ as its main components have been conventionally used as an insulating ceramic material used in manufacturing electronic components such as a chip type resistor, a thin film inductor, a thin film capacitor or a circuit board. The ceramic material is obtained by first dispersing ceramic raw materials such as $SiO_2$, $Al_2O_3$, $B_2O_3$, CaO, MgO, or the like in powdery forms and a binder component in a solvent, forming the same in a sheet form, and finally sintering the same.

For example, a chip type resistor is manufactured using the following steps: First an electrode pattern using a conductive paste such as a silver paste in printed on an alumina substrate or a glass-based insulating ceramic substrate obtained via the process as described above, and then a baking is performed thereto to form electrodes between a pair of resistor layers, which are so called "embedded electrodes". Next, a resistor paste having $RuO_2$ as its main component is applied to the embedded electrodes and a backing is performed to form the resistor. Further, an under glass is applied on the resistor layer, a baking being performed thereafter, and a laser trimming is performed to the resistor layer to control the resistance between the embedded electrodes. Next, an over glass is applied thereon and a baking is performed to form an overcoat layer. Next, the ceramic substrate is divided into individual chips. The individual chips are subjected to a barrel grinding. Finally, a conductive paste, e.g., sliver paste, is printed on both ends of the chip and a nickel gilt or solder gilt is performed on the conductive paste layer to form external electrodes. Through these steps, the chip resistor is obtained.

As described above, in the conventional method, the chip type electronic component such as the chip type resistor using the alumina substrate and the glass-based insulating ceramic material is obtained by dicing a sintered ceramic substrate. For this reason, burrs or cracks may form within or on the chip and the shape thereof may get distorted. Further, a dimensional accuracy of the chip may not be attained.

The chip type electronic components of a lower dimensional accuracy having burrs or cracks therein as described above are not suitable for a so-called mass loading process wherein a number of electronic components kept in a hopper or the like are subjected to a mass transfer through a pipe-shaped shoot to a predetermined destination on the circuit board to be loaded thereon. For this reason, such chip type electronic components are normally supplied in such a manner that the chip type electronic components are received on a carrier type, with each of the components being separated from one another at a same distance and a cover tape being laminated on the carrier tape. Accordingly, the chip type electronic components are loaded on the circuit board using so-called tapping loading process, wherein the chip type electronic components are taken out from the carrier tape after the cover sheet has been removed. This process is so-called tapping loading process.

In case of the tapping loading process, however, since the chip type electronic components are packed on the carrier tape at a predetermined distance therebetween, packing costs additionally incur. Further, it is cumbersome to remove the cover sheet from the carrier tape one by one and to take out individually the chip type electronic component from the carrier tape for the loading process. Furthermore, the tapping loading process are not suitable for a multi mounting method wherein a number of various kinds of electronic components are concurrently transferred to a template and then concurrently loaded on the circuit board by using suction heads.

SUMMARY OF THE INVENTION

It is, therefore, a primary object of the invention to provide a ceramic material capable of allowing a ceramic substrate made thereof to be cut by a grinding machining using a cutter, in stead of breaking means, to thereby provide chip type electronic components having an enhanced dimensional accuracy and reduced number of burrs or cracks therein, making them suitable for a mass transfer.

The above and other objects of the invention are accomplished by providing a ceramic composition obtained in such a manner that a proper amount of at least one component selected from a group of $MgSiO_3$ and $CaSiO_3$ is added to a glass-based ceramic having a properly determined composition ratio, with a sintered state thereof having at least 1500 kg/cm$^2$ as its anti-bending strength. By using the sintered ceramic substrate obtained from the ceramic composition, electronic components such as a chip type resistor, a thin film inductor, a thin film capacitor or a circuit board are obtained. Since the ceramic substrate constituting the electronic component as a base material has a good grindability, the electronic components can be separated into a plurality of individual chips by a grinding machining without an inadvertent break of the ceramic substrate. Further, it is possible to prevent the electronic component from being broken during a loading process.

The inventive ceramic composition for use in forming the electronic components is a ceramic composition including a glass based material including $SiO_2$, $Al_2O_3$, $B_2O_3$, and at least one selected from a group of Cao and MgO; and particles dispersed in the glass based material, the particles including $CaSiO_3$ or $MgSiO_3$ as a main component, wherein a sintered state of the ceramic composition has an anti-bending strength of 1500 kg/cm$^2$ or higher. To be more specific, the inventive ceramic composition has less than or equal to 70 weight % of a glass based material and more than or equal to 30 weight % of the particles, the glass based material including 25–60 weight % $SiO_2$, 5–25 weight % $Al_2O_3$, and 5–25 weight % $B_2O_3$, and at least 5–30 weight % of one selected from a group of MgO and CaO, and the particles including $MgSiO_3$ or $CaSiO_3$.

$MgSiO_3$ or $CaSiO_3$ particles are, for example, filler components charged within the glass based material and are dispersed in the glass based material.

A ceramic material sintered in accordance with the present invention is obtained by a conventional forming method, wherein a green ceramic material is first formed using the ceramic composition described above and then is sintered. The anti-bending strength of the sintered ceramic material is 1500 kg/cm$^2$ or greater. Further, the inventive electronic component has a pattern made of a conductive material, a dielectric material, a magnetic material or a resisting material formed on the ceramic substrate of the sintered ceramic material as described above.

In the sintered ceramic material obtained from the inventive ceramic composition in forming the electronic components, at least one selected from the group of $MgSiO_3$ and $CaSiO_3$ is dispersed as a filler component. As compared with a material without $MgSiO_3$ or $CaSiO_3$ present therein, the inventive sintered ceramic material has an increased grindability, allowing the ceramic substrate to be divided into a plurality of chips. As a result, a chip type electronic component having a higher dimensional accuracy can be obtained.

Further, since boring for forming a through-hole can be performed to the ceramic substrate in a sintered state, it is possible to obtain an electronic component having the through-hole with a higher accuracy without a dimensional error which may be caused by a contraction during the sintering.

Furthermore, since the anti-bending strength of the sintered ceramic body is 1500 kg/cm$^2$ or greater, a possibility for the electronic components or the ceramic substrate to be broken due to an impact which may occur when it is loaded onto the circuit board is reduced. For the same reason, it is possible for the electronic component to maintain its structural integrity during the loading thereof using a high-speed mounter or the like. Its structural integrity can be guaranteed even in a situation where the inventive sintered ceramic material is used as a substrate of the electronic component to be loaded or it is used as a circuit board on which the electronic component is loaded.

The reason why the inventive ceramic composition has such a composition ratio is as follows: First, if the weight % of $SiO_2$ is less than 25, it is difficult to make the ceramic composition into a glass. As a result, the ceramic cannot be sintered. On the other hand, if the weight % of $SiO_2$ is higher than 60 or the weight % of $Al_2O_3$ is less than 5, the ceramic material becomes less workable since the sintering temperature must be increased accordingly and an amount of $SiO_2$ remaining within the ceramic material after the sintering increases.

On the other hand, if the weight % of $Al_2O_3$ is greater than 25, the ceramic material becomes less workable since the sintering temperature must be increased and a feldspar ($CaAl_2Si_2O_8$) is precipitated.

If the weight % of $B_2O_3$ in the glass based material is less than 5, it becomes difficult to sinter the ceramic material as a result of the glass based material becoming less fluid. On the other hand, if the weight % of $B_2O_3$ is higher than 25, the ceramic material becomes less workable since a feldspar ($CaAl_2Si_2O_8$) is precipitated and the glass based material becomes too fluid during the sintering.

If the weight % of at least one selected from the group MgO or CaO is less than 5, it results in the sintering temperature being increased, making it difficult to sinter the ceramic. On the other hand, if the weight % of at least one selected from the group MgO or CaO is higher than 30, it becomes difficult to sinter the ceramic since a crystal having a same structure as that of $MgSiO_3$ and $CaSiO_3$ is precipitated, reducing the glass based material which, in turn, makes it difficult to sinter the ceramic.

If the weight % of $MgSiO_3$ or $CaSiO_3$ is less than 30, the sintered ceramic is liable to break or to have a crack therein due to its lowered strength, although the ceramic can be easily grinded. Further, although a diopside (Ca, Mg)$SiO_3$ in a type where a part of Ca from $CaSiO_3$ substitutes Mg or a part of Mg from $MgSiO_3$ substitutes Ca occurs in the sintered ceramic material, a characteristic of the ceramic does not substantially differ from $CaSiO_3$ or $MgSiO_3$.

DETAILED DESCRIPTION OF THE PREFERRED EMBODIMENTS

Now, as a preferred embodiment, a detailed description of an example of a manufacturing method of the present invention will be made. First, powders of $Al_2O_3$, $SiO_2$, $B_2O_3$, MgO and CaO, all which are glass based materials, are mixed together, on a basis of the weight % described above. An appropriate amount of water is added to the mixture; and then is placed in a porcelain container together with zirconium beads, to be wet ball-milled. The wet ball-milled mixture is then dehydrated and dried. The dried material is then calcined at a temperature of 800° C. for 3 hours. Next, the calcined material is dispersed in water; and then the wet calcined material is placed in a porcelain container together with beads and then wet ball-milled into powders having an average diameter of 2 $\mu$m, resulting in a glass based material.

At least one component selected from the group of $MgSiO_3$ and $CaSiO_3$ is then added to the glass based material, in a weight % described above. An appropriate amount of water is added to this mixture; and then the mixture is placed in a porcelain container together with zirconium beads, to be wet ball-milled, followed by dehydrating and drying. A ceramic slurry is formed by dispersing the dried mixture in water along with an organic binder.

The ceramic slurry is formed into a ceramic green sheet having a thickness of 280 $\mu$m by a doctor blade. The obtained ceramic green sheet is cut into a rectangular shape of a predetermined size by blanking. Next, two ceramic green sheets are superposed and pressed into one body to be sintered at a predetermined temperature to form a ceramic substrate. Anti-bending strength of the ceramic substrate is equal to or greater than 1500 kg/cm$^2$.

Next, the ceramic substrate is coated with a conductive paste, e.g., a silver paste, on the glass-based insulating ceramic substrate obtained via the process as described above, prior to being baked to form electrodes between a pair of resistor layers, which are so called "embedded electrodes". Next, a resistor paste having $RuO_2$ as its main component is applied to the embedded electrodes and a baking is performed to form the resistor. Further, an under glass is applied on the resistor layer, a baking being performed thereafter, and a laser trimming is performed to the resistor layer to control the resistance between the embedded electrodes. Next, an over glass is applied thereon and a baking is performed to form an overcoat layer.

Next, the ceramic substrate is divided into individual chips. The individual chips are subjected to a barrel grinding. Finally, a conductive paste, e.g., sliver paste, is applied on both ends of the chip and a nickel gilt or solder gilt is performed on the silver paste layer to form external electrodes.

Unlike the material only having the glass-components, the inventive ceramic composition for use in forming electronic components as described above has an improved grindability, enabling the ceramic substrate therefrom to be divided into individual chips, wherein at least one selected from the group of $MgSiO_3$ and $CaSiO_3$ is dispersed in the glass based material. As a consequence, the dimensional accuracy is enhanced and a possibility of the burrs or the cracks forming is reduced.

Although, so far, one example of manufacturing the chip type resistor using the ceramic composition and the sintered state thereof has been described, the thin film inductor, the thin film capacitor or the circuit board can be manufactured in a same manner as that for the chip type resistor, except for a difference in the materials printed on the ceramic substrate or a difference in the printing patters. For example, the thin film inductor can be formed by printing the magnetic paste and the conductive paste between at least one pair of electrodes maintained on the ceramic substrate as the conductive paste. The thin film inductor can be made by repeatedly alternatively applying the conductive paste and a dielectric material on the ceramic substrate. Further, the circuit board can be made by forming a circuit pattern on the ceramic substrate using the resistance material, the dielectric material and the conductive material. Methods of manufacturing those are basically identical to one another.

Now, results of test made to the preferred embodiments are described in detail. First, the powders of $Al_2O_3$, $SiO_2$, $B_2O_3$, Mgo and CaO are prepared as the glass based materials constituting the ceramic composition for use in forming the electronic components; and are mixed together, each of the mixtures having a different amount of each of the components, thereby generating five kinds of mixture for glass based materials.

An appropriate amount of water is mixed with these mixtures; and then each of the mixtures is placed in a porcelain container together with zirconium beads, to be wet ball-milled, followed by dehydrating and drying. The dried mixture is then calcined at 800° C. for 3 hours. Next, water is added to the calcined material; and then the wet calcined material is placed in a porcelain container together with beads and then wet ball-milled into powders having an average diameter of 2 μm. During this process, five glass-based mixtures are obtained. The weight % ratios are shown in Table 1.

TABLE 1

| Weight % of glass based material | $SiO_2$ | $Al_2O_3$ | $B_2O_3$ | MgO+CaO |
|---|---|---|---|---|
| A | 41 | 14 | 19 | 26 |
| B | 65 | 10 | 11 | 14 |
| C | 35 | 30 | 14 | 21 |
| D | 55 | 3 | 17 | 25 |
| E | 48 | 15 | 30 | 7 |

With these glass-based materials, at least one component or both components of the group of $MgSiO_3$ and $CaSiO_3$ is mixed, on a basis of the weight % ratio described above. These mixtures are dispersed in an appropriate amount of water; and then each of the mixtures is placed in a porcelain container together with zirconium beads, being wet ball-milled, followed by dehydrating and drying. The dried mixture is then dispersed in water along with an organic binder to form a ceramic slurry.

The ceramic slurry is formed into a ceramic green sheet having a thickness of 280 μm by a doctor blade. The obtained ceramic green sheet is cut into a rectangular shape of a predetermined size by blanking. Next, two ceramic green sheets are superposed and pressed into one body. The pressed sheet is sintered at a predetermined temperature to form a ceramic substrate. The weight % ratios of the five different ceramic substrates obtained in this manner are shown in Table 2-1 through 2-4. The weight % ratio of the glass based material is represented in its weight percent with respect to the total ceramic substrate weight. The content ratio of filler component is also represented in a same manner.

The ceramic substrate obtained in this manner is divided into the individual chips using a dicing saw. The facility of grinding the ceramic substrate is evaluated and is represented with "O", "Δ" and "X", wherein the symbols "O" and "X" means good and bad, respectively, the symbol "Δ" indicating in-between. The accuracy of machining is evaluated and represented with "O", "Δ" and "X", wherein the symbols "O" and "X" mean good and bad, respectively, the symbol "Δ" indicating in-between, based on the measured size of the crack or burr after the ceramic substrate is divided by the grinding machine, wherein each of the chips is 1.0×0.5 mm in size and the grinding blade is fed at a speed of 10 mm/sec. Further, measurement based on a standard of JIS-R1601 is performed to evaluate the anti-bending strength of the ceramic substrate. Further, P.I. means samples having a weight % ratios in accordance with the present invention, while C.E. meaning comparative examples to be compared with the inventive material. The results from the measurements described above are shown in the Tables 2-1 through 2-4.

TABLE 2-1

| No. | | 1 | 2 | 3 | 4 | 5 | 6 | 7 | 8 | 9 |
|---|---|---|---|---|---|---|---|---|---|---|
| Classification | | C.E. | C.E. | C.E. | P.I. | P.I. | P.I. | P.I. | P.I. | P.I. |
| Glass based material | Ratio | 100 | 90 | 80 | 70 | 60 | 50 | 40 | 30 | 20 |
| | Content | A | A | A | A | A | A | A | A | A |
| $CasiO_3$ | | 0 | 10 | 20 | 30 | 40 | 50 | 60 | 70 | 80 |
| $MgSiO_3$ | | — | — | — | — | — | — | — | — | — |
| $Al_2O_3$ | | — | — | — | — | — | — | — | — | — |
| Accuracy of machining | | X | X | Δ | ○ | ○ | ○ | ○ | ○ | ○ |
| Machining speed | | ⊗ | ⊗ | ○ | ○ | ○ | ○ | ○ | ○ | ○ |
| Anti-bending strength | | 520 | 780 | 1090 | 1720 | 1950 | 2020 | 2130 | 2180 | 2260 |
| Sintering temperature | | 800 | 850 | 890 | 940 | 970 | 1000 | 1080 | 1210 | 1270 |
| Existence of second phase | | No | ↑ | ↑ | ↑ | ↑ | ↑ | ↑ | ↑ | ↑ |

TABLE 2-2

| No. | 10 | 11 | 12 | 13 | 14 | 15 | 16 | 17 | 18 |
|---|---|---|---|---|---|---|---|---|---|
| Classification | C.E. | C.E. | C.E. | P.I. | P.I. | P.I. | P.I. | P.I. | P.I. |
| Glass based material Ratio | 100 | 90 | 80 | 70 | 60 | 50 | 40 | 30 | 20 |
| Glass based material Content | A | A | A | A | A | A | A | A | A |
| $CaSiO_3$ | — | — | — | — | — | — | — | — | — |
| $MgSiO_3$ | 0 | 10 | 20 | 30 | 40 | 50 | 60 | 70 | 80 |
| $Al_2O_3$ | — | — | — | — | — | — | — | — | — |
| Accuracy of machining | X | X | Δ | ○ | ○ | ○ | ○ | ○ | ○ |
| Machining speed | ⊗ | ⊗ | ○ | ○ | ○ | ○ | ○ | ○ | ○ |
| Anti-bending strength | 500 | 750 | 1020 | 1580 | 1810 | 1850 | 1920 | 2020 | 2100 |
| Sintering temperature | 810 | 860 | 920 | 950 | 1050 | 1080 | 1120 | 1240 | 1350 |
| Existence of second phase | No | ↑ | ↑ | ↑ | ↑ | ↑ | ↑ | ↑ | ↑ |

TABLE 2-3

| No. | 19 | 20 | 21 | 22 | 23 | 24 | 25 | 26 | 27 |
|---|---|---|---|---|---|---|---|---|---|
| Classification | C.E. | C.E. | C.E. | P.I. | P.I. | P.I. | P.I. | P.I. | P.I. |
| Glass based material Ratio | 100 | 90 | 80 | 70 | 60 | 50 | 40 | 30 | 20 |
| Glass based material Content | A | A | A | A | A | A | A | A | A |
| $CaSiO_3$ | 0 | 5 | 10 | 15 | 20 | 25 | 30 | 35 | 40 |
| $MgSiO_3$ | 0 | 5 | 10 | 15 | 20 | 25 | 30 | 35 | 40 |
| $Al_2O_3$ | — | — | — | — | — | — | — | — | — |
| Accuracy of machining | X | X | Δ | ○ | ○ | ○ | ○ | ○ | ○ |
| Machining speed | ⊗ | ⊗ | ○ | ○ | ○ | ○ | ○ | ○ | ○ |
| Anti-bending strength | 510 | 760 | 1060 | 1660 | 1890 | 1970 | 2050 | 2100 | 2190 |
| Sintering temperature | 810 | 860 | 930 | 960 | 1010 | 1050 | 1100 | 1230 | 1310 |
| Existence of second phase | No | ↑ | ↑ | ↑ | ↑ | ↑ | ↑ | ↑ | ↑ |

TABLE 2-4

| No. | 28 | 29 | 30 | 31 | 32 | 33 | 34 | 35 | 36 | 37 | 38 |
|---|---|---|---|---|---|---|---|---|---|---|---|
| Classification | C.E. | C.E. | C.E. | C.E. | C.E. | C.E. | C.E. | C.E. | C.E. | C.E. | Alumina substrate of 98 weight % |
| Glass based material Ratio | 70 | 50 | 50 | 50 | 50 | 50 | 50 | 50 | 50 | 50 | |
| Glass based material Content | A | A | B | B | C | C | D | D | E | E | |
| $CaSiO_3$ | — | — | 50 | — | 50 | — | 50 | — | 50 | — | |
| $MgSiO_3$ | — | — | — | 50 | — | 50 | — | 50 | — | 50 | |
| $Al_2O_3$ | 30 | 50 | — | — | — | — | — | — | — | — | |
| Accuracy of machining | Δ | Δ | X | Δ | Δ | Δ | Δ | Δ | Δ | X | Δ |
| Machining speed | X | X | Δ | X | X | X | Δ | X | X | Δ | Δ |
| Anti-bending strength | 2160 | 2740 | 1880 | 1830 | 2210 | 2180 | 1910 | 1890 | 2340 | 2360 | 3820 |
| Sintering temperature | 930 | 950 | 1040 | 1070 | 1010 | 1050 | 1120 | 1160 | 970 | 1010 | — |
| Existence of second phase | No. | ↑ | $SiO_2$ remained | | Precipitation of second phase | | $SiO_2$ remaining | | Precipitation of second phase | | — |

As shown in the Tables 2-1 through 2-3, in sample Nos. 4–9, 13–18 and 21–27, a second phase in the form of feldspar($CaAl_2Si_2O_8$) does not get precipitated and there is no $SiO_2$ remaining. For this reason, these ceramic substrates are provided with a good workability in grinding, which in turn, enables the chip to be machined at a good machining speed, resulting in a good dimensional accuracy.

The second phase represents a reaction product between the filler component and the glass based material, wherein, in this case, the second phase is a crystal, e.g., Ca(Mg) $Al_2Si_2O_6$ precipitated from a reaction between alkali earth metals such as CaO and MgO of the glass based material and $Al_2O_3$ and $SiO_2$. The crystals may degrade the workability of the ceramic substrate, since they have a higher hardness than that of $MgSiO_3$.

Unlike the above, in sample Nos. 30 and 31 in Table 2-4 having 65 weight % $SiO_2$, $SiO_2$ remains in the ceramic substrate and a sintering temperature thereof increases. This may degrade the workability of the ceramic substrate, the dimensional accuracy of the chip and the machining speed of the grinding.

In connection with sample Nos. 34 and 35 having less than 5 weight % $Al_2O_3$, $SiO_2$ remains in the ceramic substrate after the sintering, resulting in the ceramic substrate having a reduced workability. In sample Nos. 32 and 33 having more than 25 weight % $Al_2O_3$, sintering temperature of the ceramic substrate is increased and the feldspar ($CaAl_2Si_2O_8$) is precipitated in the ceramic substrate during the sintering, which, in turn, may degrade the grinding workability of the ceramic substrate.

In sample Nos. 36 and 37 having more than 25 weight % $B_2O_3$, since fluidity of the ceramic substrate becomes exceedingly large during the sintering, the feldspar ($CaAl_2Si_2O_8$) is precipitated as the second phase in the ceramic substrate, which, in turn, may degrade the grinding workability of the ceramic substrate. In sample Nos. 1–3, 10–12 and 19–21 having less than 30 weight % $MgSiO_3$ and $CaSiO_3$, the ceramic substrate may easily break or may form cracks, as a result of a low anti-bending strength.

Further, attempts were made to form ceramic substrates from a sample having less than 25 weight % $SiO_2$, a sample having less than 5 weight % $B_2O_3$, a sample having less than 5 weight % one selected from a group of MgO and CaO, and a sample having one of MgO and CaO of more than 30 weight %. However, these couldn't be made into the ceramic substrates, since they could not be sintered.

As described above, the sintered material obtained from the inventive ceramic composition for use in forming electronic components allows the ceramic substrate to be divided into a plurality of chips by a grinding machining using a cutter, regardless of breaking means. For this reason, the chip type electronic components having an enhanced dimensional accuracy and reduced number of burrs or cracks therein are obtained, making them suitable for the mass transfer.

Further, since boring for forming a through-hole can be performed to the ceramic substrate in a sintered state, it is possible to obtain an electronic component having the through-hole with a higher accuracy without a dimensional error which may be caused by a contraction during the sintering.

Furthermore, since the anti-bending strength of the sintered ceramic body is 1500 $kg/cm^2$ or higher, a possibility for the electronic components or the ceramic substrate to be broken due to an impact which may occur when it is loaded onto the circuit board is reduced. For the same reason, it is possible for the electronic component to maintain its integrity during the loading thereof using a high-speed mounter or the like.

What is claimed is:

1. A ceramic composition comprising:

a glass based material including $SiO_2$, $Al_2O_3$, $B_2O_3$, and at least one selected from the group consisting of CaO and MgO; and particles dispersed in the glass based material, the particles including $CaSiO_3$ or $MgSiO_3$ as a main component, wherein a sintered state of the ceramic composition has an anti-bending strength of 1500 $kg/cm^2$ or higher and wherein said ceramic composition includes less than or equal to 70 weight % of the glass based material and more than or equal to 30 weight % of the particles, the glass based material including 25–60 weight % of $SiO_2$, 5–25 weight % $Al_2O_3$, and 5–25 weight % $B_2O_3$, and 5–30 weight % of CaO and/or MgO.

2. The ceramic composition of claim 1, wherein said $MgSiO_3$ or $CaSiO_3$ is a filler for the glass based material.

3. The ceramic composition of claim 1, wherein said $MgSiO_3$ or $CaSiO_3$ is dispersed within the glass based material.

4. An electronic component provided with a ceramic substrate produced by sintering the ceramic composition of claim 1.

5. The electronic component of claim 4, wherein a pattern made of at least one selected from the group consisting of a conductive material, a dielectric material, a magnetic material and a resisting material is provided on the ceramic substrate.

6. A sintered ceramic material obtained by sintering a molded ceramic composition, wherein the ceramic composition comprising:

a glass based material including $SiO_2$, $Al_2O_3$, $B_2O_3$, and at least one selected from the group consisting of CaO and MgO; and particles dispersed in the glass based material, the particles including $CaSiO_3$ or $MgSiO_3$ as a main component, wherein a sintered state of the ceramic composition has an anti-bending strength of 1500 $kg/cm^2$ or higher and wherein said ceramic composition includes less than or equal to 70 weight % of the glass based material and more than or equal to 30 weight % of the particles, the glass based material including 25–60 weight % of $SiO_2$, 5–25 weight % $Al_2O_3$, and 5–25 weight % $B_2O_3$, and 5–30 weight % of CaO and/or MgO.

* * * * *